United States Patent [19]

Zavoda

[11] Patent Number: 5,115,724
[45] Date of Patent: May 26, 1992

[54] ADAPTER RING FOR A DIAPHRAGM SEAL

[75] Inventor: John R. Zavoda, LaGrange, Tex.

[73] Assignee: Zavoda Manufacturing Co., Inc., LaGrange, Tex.

[21] Appl. No.: 617,210

[22] Filed: Nov. 23, 1990

Related U.S. Application Data

[62] Division of Ser. No. 409,737, Sep. 20, 1989.

[51] Int. Cl.$^5$ ............................................. F16J 3/00
[52] U.S. Cl. ............................................. 92/102
[58] Field of Search ................... 92/96, 98 R, 102; 277/71, 75

[56] References Cited

U.S. PATENT DOCUMENTS

| | | | |
|---|---|---|---|
| 2,580,546 | 1/1952 | Hobson | 277/229 |
| 2,597,976 | 5/1952 | Cousins | 277/229 |
| 2,679,760 | 6/1954 | Harland et al. | 92/98 R |
| 3,141,685 | 7/1964 | Watts | 277/75 |
| 3,645,139 | 2/1972 | Zavoda | 92/102 |
| 3,828,823 | 8/1974 | Douglas | 285/55 |
| 3,921,673 | 11/1975 | Pero | 285/55 |
| 4,109,535 | 8/1978 | Reed et al. | 92/102 |
| 4,192,192 | 3/1980 | Schnell | 92/98 R |
| 4,484,770 | 11/1984 | Sloane | 285/55 |
| 4,494,776 | 1/1985 | Press | 285/55 |
| 4,549,741 | 10/1985 | Usher et al. | 277/206 R |
| 4,852,466 | 8/1989 | Freeman et al. | 92/104 |
| 4,885,983 | 12/1989 | Zavoda | 92/98 R |

FOREIGN PATENT DOCUMENTS 572643 of 1958 Italy ..................... 92/102

OTHER PUBLICATIONS

The Seals Book, Machine Design c1961 pp. 98-99.

Primary Examiner—Edward K. Look
Assistant Examiner—F. Daniel Lopez
Attorney, Agent, or Firm—Harrison & Egbert

[57] ABSTRACT

The present invention is a diaphragm seal for an instrument having a first coupling member with a cavity in communication with the instrument, a pressure-responsive diaphragm attached within the cavity of the first coupling member, an adapter ring fitted to the first coupling member, and a second coupling member connected to the first coupling member. The adapter ring is a rigid cylindrical member having an internal shoulder extending inwardly of the cylindrical member at the end opposite the diaphragm. The adapter ring has a sleeve fitted within the cylindrical member so as to overlie the internal shoulder. The second coupling member has an internal area communicating with the interior of the adapter ring. The adapter ring is interposed between the first and second coupling members. The second coupling member has a lining surrounding the internal area. This lining is in sealed relationship with the sleeve of the adapter ring. The lining and the sleeve are composed of a synthetic resin polymeric material.

9 Claims, 2 Drawing Sheets

ADAPTER RING FOR A DIAPHRAGM SEAL

RELATED APPLICATIONS

The present application is a divisional application of U.S. patent application Ser. No. 07/409,737, filed on Sep. 20, 1989, and entitled "Adapter Ring", presently pending.

TECHNICAL FIELD

The present invention relates to adapter rings. More particularly, the present invention relates to connectors between plastic lined pipe and diaphragm seals.

BACKGROUND ART

In various process industries, particularly the chemical process industries, various liquids, gases, or slurries are maintained under vacuum or under pressure, either in vessels or in flow conduits, and the pressure values must be monitored. For this purpose, suitable gages or recording instruments are mounted on the process vessels or on the flow lines or are remotely coupled thereto, to sense, indicate and record the existing pressure values.

In most chemical processes, as well as other process industries, it is both necessary and desirable to isolate the pressure sensing element of the recording instrument from the abrasive or corrosive or clogging action of the process material so that the sensing element will not be subjected to undue deterioration, injury, or wear. To accomplish this isolation, it is a common practice to provide a flange member or similar coupling unit having a cavity in communication with the pressure recording instrument. This instrument flange member is secured in abutting relationship to a process flange member which has a cavity in communication with the pressure fluid to be monitored. A flexible diaphragm of metal, rubber, or synthetic resin serves to partition the instrument cavity from the process fluid cavity and is secured between the coupling or flange members at its marginal positions.

One side of the flexible diaphragm is exposed to the pressure of the process fluids. The cavity in the instrument flange on the other side of the flexible diaphragm is filled with light oil or other suitable hydraulic fluid for communication with the pressure sensing element. The central portion of the flexible diaphragm is displaced or expanded in response to pressure fluctuations from the process fluid cavity and transmits these changing pressure values through the hydraulic fluid medium in the instrument flange cavity for sensing by recording gage or instrument.

All parts of the diaphragm seal that come in contact with a process fluid or gas, in a pressure system, are classified and known as "wetted" parts. The material of the wetted parts must be compatible with and not generally affected by the process fluid or gas. The synthetic resin polymeric material TEFLON is the choice material for a "wetted part" by many in the chemical industry because of the compatibility of TEFLON with practically all corrosive fluids and gasses. It is also the choice of many other industries such as foods, pharmaceuticals, paper pulp, etc.

The design and construction of a flanged-type diaphragm seal requires that an adapter ring must be used to interface properly with a pipe flange that a user would have in his pipeline. At times, the material of the adapter ring will include TEFLON. TEFLON, within the adapter ring, and elsewhere, shows a characteristic that is known as "cold flow". When TEFLON is squeezed, it will act similar to a gob of stiff grease. TEFLON cannot be compressed. When squeezed, TEFLON will flow from the squeezed area to an area that is not confining, or at least less confining. One type of diaphragm seal adapter ring construction utilizes TEFLON that is shaped as a doughnut and used as an insert or liner confined by an outer metal shell or ring at the periphery. This outer metal shell or ring contains the cold flow of the TEFLON. In common parlance, the adapter ring is called a "TEFLON-lined" adapter ring.

A flange-type diaphragm seal is attached to a user's pipe flange, of the same pipe class and pressure class, by bolts that are torqued sufficiently so as to prevent leakage at the attaching faces. Ideally, the amount of torquing is controlled so that the TEFLON will not distort and "cold flow" elsewhere adjacent to the diaphragm itself. The adapter ring is used between the instrument flange space of the diaphragm seal and the face of the user's pipe flange so as to interface the flanges properly.

At present, a TEFLON-lined adapter ring is manufactured by Zavoda Manufacturing Company, Inc., of 8402 Scranton Street, Houston, Tex., and other manufacturers. After experimentation, it has been found that the lines of force that are transmitted by the torquing of the bolts of the instrument flange transmit these forces directly to the metal shell of the adapter ring. The instrument flange also transmits a force on the periphery of the diaphragm. The diaphragm, in turn, exerts the forces to the TEFLON liner of the adapter ring. The force, created by the torquing of the flange bolts, is transmitted through the outer metal adapter ring shell of the adapter ring assembly to the user's pipe flange. A suitable force is required to seal all interfaces between the instrument flange of the diaphragm seal and the user's metal pipe flange.

It is an object of the present invention to provide a TEFLON lined adapter ring that is suitable for attachment to TEFLON lined pipe.

It is another object of the present invention to provide a TEFLON-lined adapter ring that minimizes any effect of thermal expansion and contraction of the TEFLON material.

It is another object of the present invention to provide a TEFLON-lined adapter ring that allows easy attachment and detachment of the diaphragm seal from the pipeline.

It is still a further object of the present invention to provide a TEFLON-lined adapter ring that will not deform or affect the operation of the diaphragm within the diaphragm seal assembly.

These and other objects and advantages of the present invention will become apparent from a reading of the attached specification and appended claims.

SUMMARY OF THE INVENTION

The present invention is an adapter ring comprising a rigid cylindrical member having an internal shoulder extending inwardly from one end and a sleeve that is fitted within the cylindrical member and extends through the opening of the cylindrical member so as to have one end of the sleeve overlying the first flat surface of the rigid cylindrical member. The internal shoulder defines a flat surface extending from and flush with the en of the cylindrical member. The cylindrical member has an opening extending longitudinally therethrough for the passage of fluids therethrough.

Specifically, the rigid cylindrical member includes a counterbore that is formed internally and inwardly of the other end of the cylindrical member. This counterbore receives the end of the sleeve opposite the overlying end. A generally sloped surface extends from the counterbore inwardly. The sleeve extends along the sloped surface. The cylindrical member, the internal shoulder, and the sloped surface are integrally formed.

The sleeve comprises a synthetic resin polymeric material, such as TEFLON. Specifically, the sleeve comprises a forward portion having an outer diameter fitted within the area of the cylindrical member defined by the counterbore. A central portion of the sleeve extends along the sloped surface. An outer portion extends from the central portion of the sleeve so as to overlie the flat surface of the internal shoulder. The sleeve serves to insulate the cylindrical member from fluids passing through the opening.

The present invention also comprises a diaphragm seal for an instrument that comprises a first coupling member having a cavity in communication with the instrument, a pressure-responsive diaphragm attached within the cavity of the coupling member, an adapter ring fitted to the first cylindrical member, and a second coupling member connected to the first coupling member so as to maintain the adapter ring in position between the first and second coupling members. The adapter ring is of a configuration described herein previously. The second coupling member has an internal area communicating with the interior of the adapter ring. The second coupling member may be a lined pipe that is joined with the adapter ring. The lining of the pipe and the sleeve of the adapter ring are comprised of a synthetic resin polymeric material, such as TEFLON. Both the first coupling member and the second coupling member have a flange extending outwardly. These flanges are lined and connected in parallel relation. The pressure-responsive diaphragm, the lining of the second coupling member, and the sleeve are comprised of the same type of material. In the assembled condition, the portion of the sleeve that overlies the flat surface of the adapter ring is interposed between the flat surface and the second coupling member. A weep hole extends through the adapter ring to the area between the sleeve and the internal surface of the adapter ring so as to allow the selective removal of gases from this interface area.

DETAILED DESCRIPTION OF THE INVENTION

Figure 1:
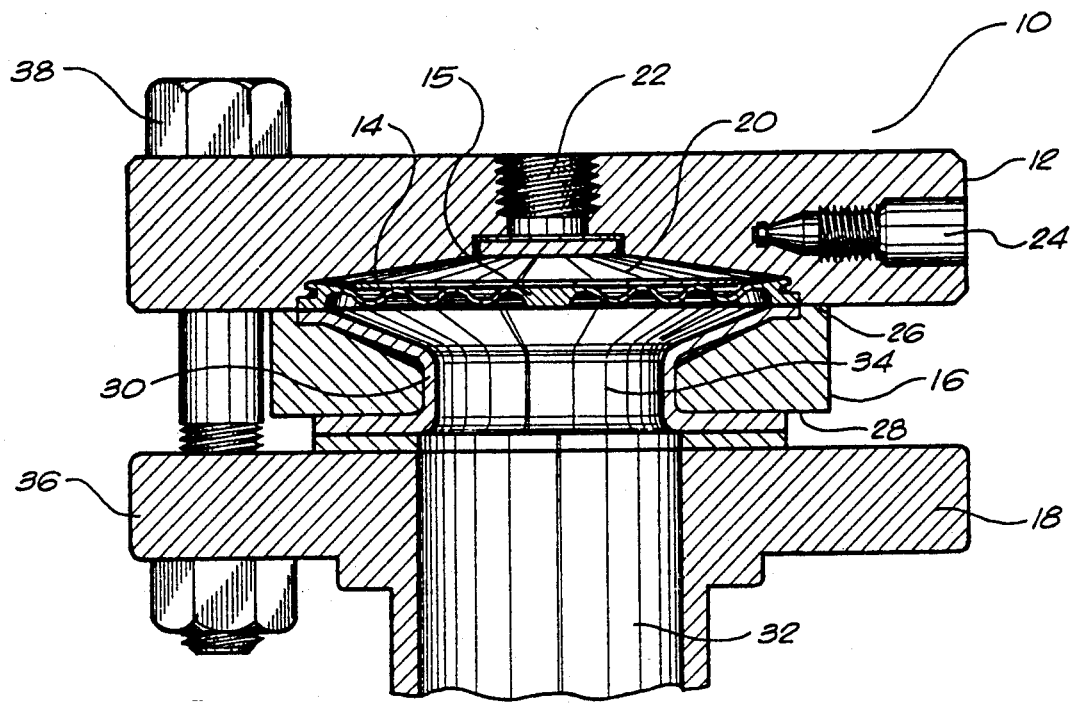
FIG. 1 is a cross-sectional view of the diaphragm seal in accordance with the preferred embodiment of the present invention.

Referring to FIG. 1, there is shown at 10, the diaphragm seal for the attachment of instruments to pipe flanges. Diaphragm seal 10 includes a first coupling member 12, a pressure responsive diaphragm 14, an adapter ring 16, and a second coupling member 18. First coupling member 12 includes a cavity 20 in communication with an instrument. The instrument is fitted into receiving area 22. Receiving area 22 is suitable for threaded connection to a pressure-sensitive instrument. A gauge or instrument may be secured, by the use of an externally threaded section, so as to allow the gage or instrument to be in communication with cavity 20 of instrument flange 12.

The pressure-sensitive diaphragm 14 is shown as a TEFLON diaphragm having a plurality of annular corrugations formed therein. The diaphragm can be of other materials. The material of the diaphragm should not be construed as a limitation on the present invention. Diaphragm 14 is snap-fitted to the walls of the cavity 20 of instrument flange 12. When the diaphragm is operative in an instrument assembly, any fluid pressure differential to which the diaphragm 12 is exposed will cause deflection or displacement of the diaphragm 14 in one direction or the other, with the greatest axial deflection occurring at the central portion 15. This deflection of the diaphragm, from a planar position of rest to a bowed or domed position of operation, causes a stretching of the diaphragm material. The function of the annular corrugations is to minimize tensile stress by introducing bendable or yieldable portions into the diaphragm body, which will minimize the linear stretch of the body. This reduction of tensile stress permits the diaphragm body 14 to have greater flexibility under deflection load and thereby greater sensitivity of response within its total operating range. Diaphragm 14 is of a type manufactured and sold by Zavoda Manufacturing Company, Inc., of Highway 71 West, P.O. Box 506, LaGrange, Tex. A bleed valve 24 is formed in instrument flange 12 and is in selected communication with the cavity 20. Bleed valve 24 is utilized so as to remove excess fluid and back pressure as needed.

Adapter ring 16 is fitted to the instrument flange 12. Adapter ring 16 is a rigid cylindrical member having an internal shoulder 28 that extends inwardly of the wall 26 at the end opposite diaphragm 14. A sleeve 30 is fitted within the cylindrical member so as to overlie the internal shoulder 28. A more detailed description of the adapter ring 16 is provided in connection with the description of FIG. 2.

The second coupling member, or pipe flange, 18 is connected to first coupling member 12. The second coupling member 18 has an internal area 32 that communicates with the interior 34 of adapter ring 16. The adapter ring 16 is interposed between the first coupling member 12 and the second coupling member 18. The second coupling member 18 may be a process flange that has a cavity which is adapted to be connected to a process flow line or receptacle. In the preferred embodiment of the present invention, the second coupling member 18 includes a flange portion 36 that receives a bolt 38 so as to connect with the instrument flange 12 in parallel relation. The tightening of bolt 38 causes a sealed relation to occur between the instrument flange 12, the adapter ring 16 and the pipe flange 18. Pipe 32 of pipe flange 18 is a type of pipe having a lined interior.

Typically, the lined interior will be a synthetic resin polymeric material, such as TEFLON. The lining of the pipe 32 will be in sealed relation with the sleeve 30 of the adapter ring 16.

Figure 2:
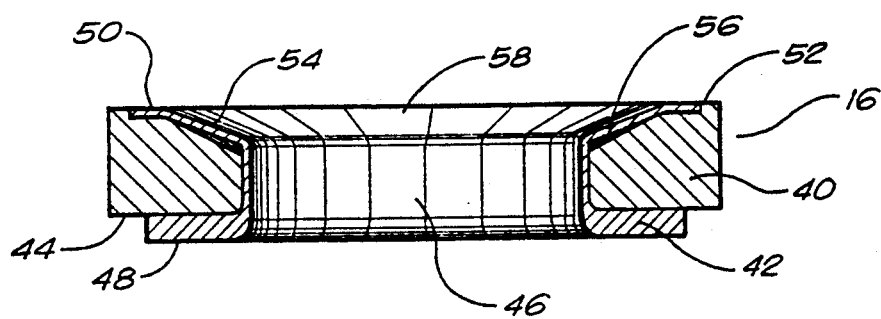
FIG. 2 is a cross-sectional view of the adapter ring in accordance with the preferred embodiment of the present invention.

FIG. 2 is a close-up view showing the adapter ring 16. It can be seen that adapter ring 16 has cylindrical member 40 and a sleeve 42 fitted within the cylindrical member 40. Cylindrical member 40 has an internal shoulder 44 extending inwardly from one end of cylindrical member 40. This internal shoulder 44 defines a flat surface flush with the end of cylindrical member 40. The cylindrical member 40 has an opening 46 extending longitudinally therethrough.

Sleeve 42 is fitted within cylindrical member 40. This sleeve 42 extends through opening 46 of cylindrical member 40. End 48 of sleeve 42 overlies the flat surface 44 of the rigid cylindrical member 40.

Cylindrical member 40 includes a counterbore 50 that is formed internally and inwardly of the end 52 of cylindrical member 40. This counterbore receives the end 54 of sleeve 42. A generally sloped surface 56 extends from the counterbore 50 inwardly so as to define the opening 46 of cylindrical member 40. The sloped surface allows fluids to drain from the interior 34 adjacent diaphragm 14. Sleeve 42 extends along the sloped surface 56. Counterbore 50 also defines an annular portion 58 at the end of the cylindrical member opposite the flat surface 44. This annular portion 58 extends outwardly beyond the end 54 of sleeve 42.

The rigid cylindrical member 40 is comprised of steel. The slope and the internal structure of the adapter ring 16 is manufactured by properly machining a piece of steel. The sleeve 42 is a synthetic resin polymeric material. Specifically, the sleeve 42 is made of polytetrafluoroethylene which is a plastic tetraflurolene homopolymer. It is composed of very long chains of linked $CF_2$ units. This polytetrafluoroethylene is sold under the name TEFLON, FLUON and FLUOROFLEX. This material is non-flammable, very durable, and a tough plastic. It is also very inert chemically. Typically, the material of sleeve 42 is not affected by water, aqua, regia, chlorosulfonic acid, acetyl chloride, boron, fluoride, hot nitric acid, boiling solns of sodium hydroxide, and organic solvents. Although no substance has been found which will dissolve the polytetrafluoroethylene, prolonged contact with fluorine, hot plasticizers, and polymeric waxes is not recommended. This material will be subject to cold flow at high pressures. Although this polytetrafluoroethylene cannot be molded, it can be extruded and pressed into shapes. Typically, tubing and pipes processing certain materials will be lined with the polytetrafluoroethylene. As such, it becomes a requirement of the present invention that the adapter ring 16 be lined with a similar material. If the fluid passing through the pipe 32 would react with the metal of adapter ring 16, then it is vitally necessary that the fluid passing through opening 46 be isolated from and out of contact with the metal portion of adapter ring 16. As such, it is necessary that the adapter ring 16 be lined with a material identical to that lining the pipe 32. Sleeve 42 of the present invention serves such a purpose.

Figure 3A:
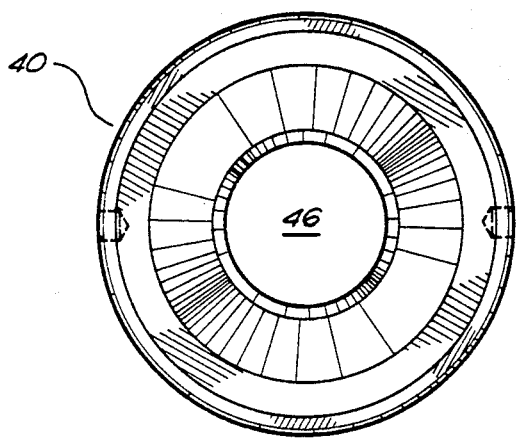
FIG. 3A is a frontal view of the cylindrical member of the adapter ring of the present invention. The cylindrical member of the adapter ring is a metal shell.

FIG. 3A is a frontal view showing the cylindrical member 40 of adapter ring 16. It can be seen that the cylindrical member (without the sleeve 42) is circular and includes opening 46. A lining will extend through opening 46 so as to isolate the steel of cylindrical member 40 from the fluid flowing through opening 46.

Figure 3B:
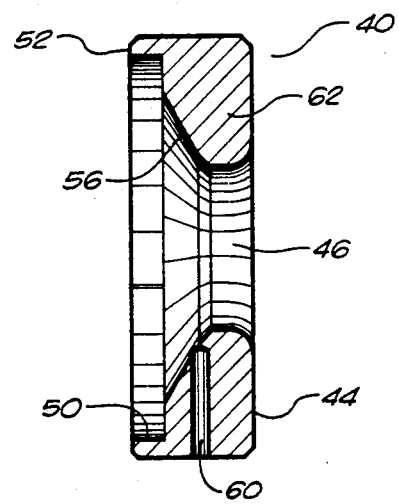
FIG. 3B is a cross-sectional view of the cylindrical member of the adapter ring of the present invention.

FIG. 3B is a cross-sectional view of the cylindrical member 40 of adapter ring 16. Specifically, in FIG. 3B, it can be seen that the counterbore 50 is formed at one end. Flat surface 44 is formed at the other end. The counterbore 50 receives the end of the sleeve 42 in a fitted fashion. Sloped surface 56 extends from counterbore 50 inwardly so as to define the opening 46. As can be seen in FIG. 3B, there is a considerable amount of metal material in the specific form of the cylindrical member 40. As such, this presents a solid attachment surface for the pipe flange 18 Which will be connected to adapter ring 16. A weep hole 60 extends through the body 62 of cylindrical member 40. Weep hole 60 can be utilized so as to remove any gaseous build-up between the exterior surface of the sleeve 42 and the internal surface of cylindrical member 40.

Figure 4A:
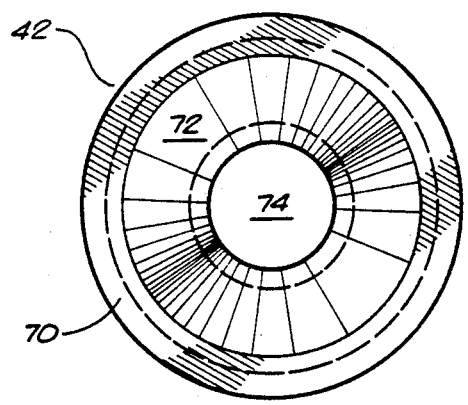
FIG. 4A is a frontal view of the sleeve of the adapter ring of the present invention.

FIG. 4A is an end view of the sleeve 42. Sleeve 42 is formed so as to have a cylindrical appearance from one end. The surface 70 that is fitted into the counterbore 50 of the cylindrical member 40 is an annular portion. Surface 70 will generally abut the end edges of the diaphragm 14. As such, surface 70 is maintained in proper sealed relationship with the diaphragm 14 for the purpose of preventing fluid from encountering the steel surface of the cylindrical member 40. Opening 74 is formed so as to pass through the opening 46 of cylindrical member 40 and to allow the fluids, from the process to which the present invention is applied, to pass therethrough.

Figure 4B:
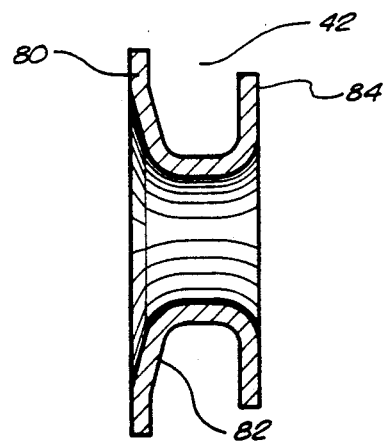
FIG. 4B is a cross-sectional view of the sleeve of the adapter ring of the present invention.

FIG. 4B is a side view showing the sleeve 42 as it is utilized when fitted into counterbore 50 of cylindrical member 40. Specifically, end portion 80 is fitted into counterbore 50 of the cylindrical member 40 of FIG. 3B. The inclined surface 82 will extend along the sloped surface 56 of cylindrical member 40. The other end 84 of sleeve 42 will reside adjacent the flat surface 44 of cylindrical member 40. To assemble the present invention, it is necessary to apply pressure to end 84 so as to allow the end 84 to overlie the flat surface 44. Once the pipe flange 18 is assembled to instrument flange 12, the end 84 will overlie the flat surface 44 of cylindrical member 40 in the manner illustrated in FIG. 1 and in FIG. 2. TEFLON is a particularly suitable material for creating this configuration since the end 84 of sleeve 42 will cold flow onto and overlie surface 44 of cylindrical member 40.

The present invention provides an adapter ring that is particularly suitable for connection with TEFLON-lined pipe. In the prior art, TEFLON was shaped as a doughnut and used as a liner insert which would be confined by an outer metal shell so as to contain the cold flow of the TEFLON. When such an adapter ring would be fitted to the diaphragm seal in the manner of FIG. 1, any tightening of bolt 38 would create deformation pressure at the area of abutment between the diaphragm 14 and the end of the doughnut-shaped TEFLON insert. As a result, diaphragm 14 would deform unnecessarily, or become dislodged from its snap-fit connection with instrument flange 12. The present invention, on the other hand, causes the torque forces from the instrument flange of the diaphragm seal to pass through the metal internal surface of the cylindrical member 40 of the adapter ring 16 so as to be applied to the broad surface of sleeve 42 at 48. In this manner of contact, the torque applied to the bolts of the diaphragm seal is not critical and can be very high without transmitting high pressures to diaphragm 14. As such, any "cold flow" occurs in the end 48 which is in abutment with the flat surface 44 of cylindrical member 40. No cold flow passes into the remaining portion of the sleeve 42 so as to cause any deformation in the area of the counterbore 50 of cylindrical member 40.

In the present invention, the uncontrolled high torquing of the bolts 38 when attaching the diaphragm seal to the pipe flange is not transferred to the relatively small area of the diaphragm's outer periphery to cause distortion of the diaphragm. The force areas are illustrated in FIG. 1 of the present invention. The sealing surfaces between the sleeve 42 and the diaphragm 14 are now controlled by the initial squeeze determined at the time of manufacture. The lines of force are transmitted from the instrument flange 12 to the metal adapter ring shell 28 and specifically at the interface surfaces of the user's pipe flange 18. The TEFLON surface in this interface area, being of a large area, can withstand a relatively high torque of foot-pounds applied to the bolts. This effectively seals the interface with the pipe flange 18. The thickness of the sleeve 30, at this interface, is sufficient to withstand numerous connections and disconnections of the diaphragm seal without leakage at this interface area. The reason for this is that the shrinkage of the thickness of the TEFLON face, due to the squeeze of the flanges, does not have to return entirely to its original shape to be effective in sealing the faces against leakage when reinstalled in the pipeline and squeezed again.

The sleeve 30 at 48 of the adapter ring 16 does get thinner, slightly, after each time the diaphragm seal 10 is attached and reattached to the pipe 32. It also becomes thinner after each time it is retightened because of the contraction of the TEFLON due to temperature change. Since TEFLO has "cold flow" characteristics, the material of sleeve 30 at the interface with pipe 32 will flow slightly to the outside diameter 26 of adapter ring and generally toward the center 32 of the part. As the TEFLON flows to the center of the part, the TEFLON tube will flow slightly upward toward the diaphragm. This movement, or growth, will not act on diaphragm 14 to cause distortion of the diaphragm. The movement of the tubelike portion of the sleeve 30 (as viewed in FIG. 4B) will end at the dish-like end 82. This will flex up or down much like a beam when held in a cantilevered position. The movement, up or down, of this dish-like portion of the sleeve 30 will take place every time there is an expansion or contraction due to temperature change. Fortunately, at no time, is the pressure transmitted to the diaphragm during this process. As such, there is no diaphragm distortion.

The present invention is a significant improvement over the prior art of adapter rings for lined pipe. The present invention maintains an effective seal of the interior of the adapter ring. The present invention prevents distortion of the diaphragm during attachment and reattachment of the adapter ring to the pipe flange. As such, diaphragm 14 may be easily replaced, removed, or maintained without great difficulty.

The foregoing disclosure and description of the invention is illustrative and explanatory thereof. Various changes in the details of the illustrated construction may be made within the scope of the appended claims without departing from the true spirit of the invention. The present invention should be limited by the following claims and their legal equivalents.

I claim:

1. A diaphragm seal for an instrument comprising:
   a first coupling member having a cavity in communication with the instrument;
   a pressure-responsive diaphragm attached within said cavity of said first coupling member, said diaphragm having a periphery connected to said first coupling member;
   an adapter ring fitted to said first coupling member, said adapter ring being a rigid cylindrical member having an internal shoulder extending inwardly of said cylindrical member at the end opposite said diaphragm, said adapter ring having a sleeve fitted within said cylindrical member so as to overlie said internal shoulder, said sleeve comprised of a synthetic resin polymeric material, said rigid cylindrical member having a surface in surface-to-surface contact with a surface of said first coupling, said surface of said cylindrical member and said surface of said first coupling being beyond said periphery of said diaphragm, said adapter ring having a counterbore formed internally and inwardly of the other end of said adapter ring, said counterbore receiving the other end of said sleeve, said other end of said sleeve aligned with and in surface-to-surface contact with said periphery of said diaphragm, a force of said contact between said cylindrical member and said first coupling being independent of a force of said contact between said sleeve and said diaphragm; and
   a second coupling member connected to said first coupling member, said second coupling member having an internal area communicating with the interior of said adapter ring, said adapter ring interposed between said first and second coupling members.

2. The diaphragm seal of claim 1, said second coupling member having a lining surrounding said internal area, said lining being in sealed relation with said sleeve of said adapter ring.

3. The diaphragm seal of claim 2, said lining comprised of a synthetic resin polymeric material.

4. The diaphragm seal of claim 1, said first coupling member having a flange extending outwardly therefrom, said second coupling member having a flange extending outwardly therefrom, said flanges of said first and second coupling members being aligned and connected in parallel relation.

5. The diaphragm seal of claim 1, said second coupling member having a flat surface extending thereacross, said sleeve interposed between said internal shoulder and said flat surface of said second coupling member.

6. The diaphragm seal of claim 1, said adapter ring comprised of a metal material.

7. The diaphragm seal of claim 6, said adapter ring further comprising:
   a generally sloped surface extending from said counterbore inwardly, said sleeve in alignment with said sloped surface, said internal shoulder and said sloped surface being integral.

8. The diaphragm seal of claim 7, said sloped surface having a weep hole extending from the periphery of said adapter ring so as to open at said sloped surface.

9. The diaphragm seal of claim 7, said sleeve comprising:
   a forward portion having an outer diameter fitted within the area of said adapter ring defined by said counterbore;
   a central portion in alignment with said sloped surface; and
   an outer portion extending from the central portion so as to overlie said internal shoulder, said sleeve separating said adapter ring from any fluid passing through the opening of said adapter ring.

* * * * *